Patented Dec. 27, 1932

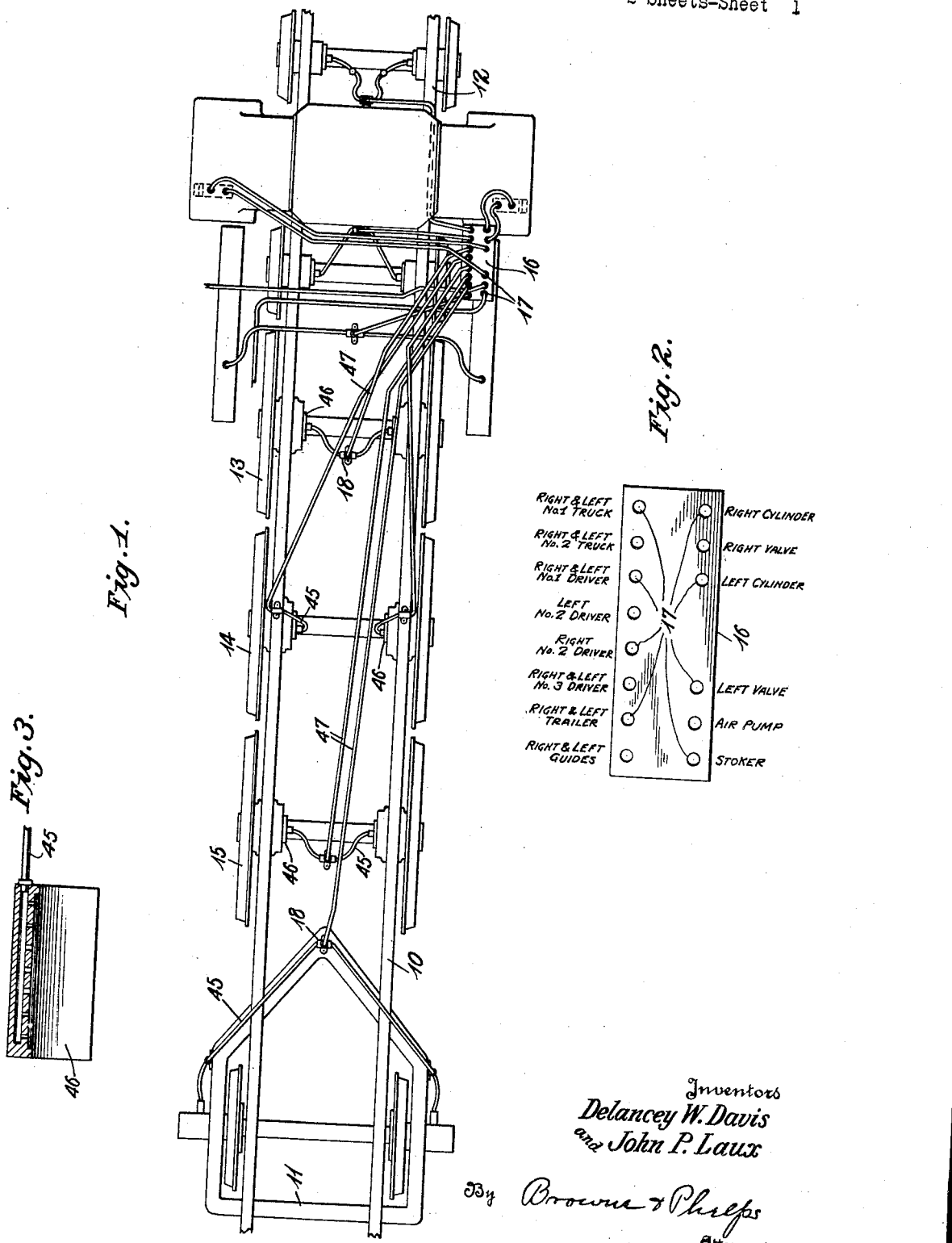

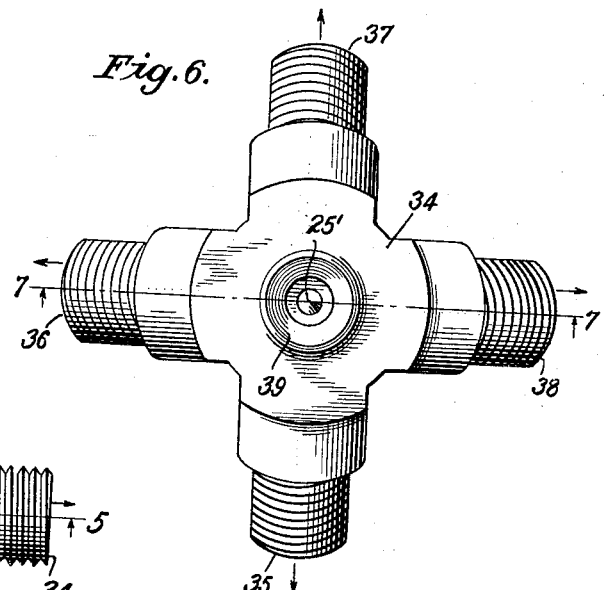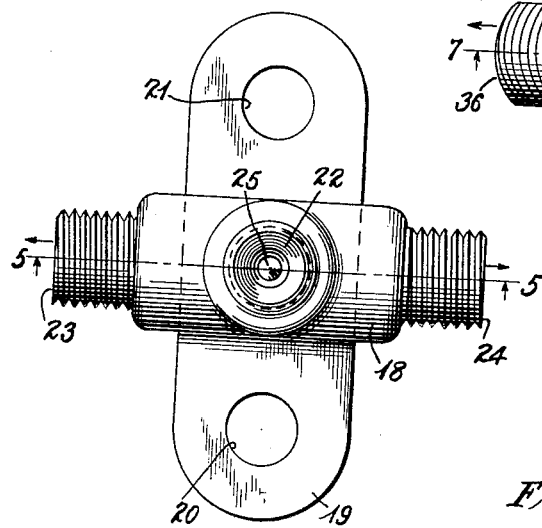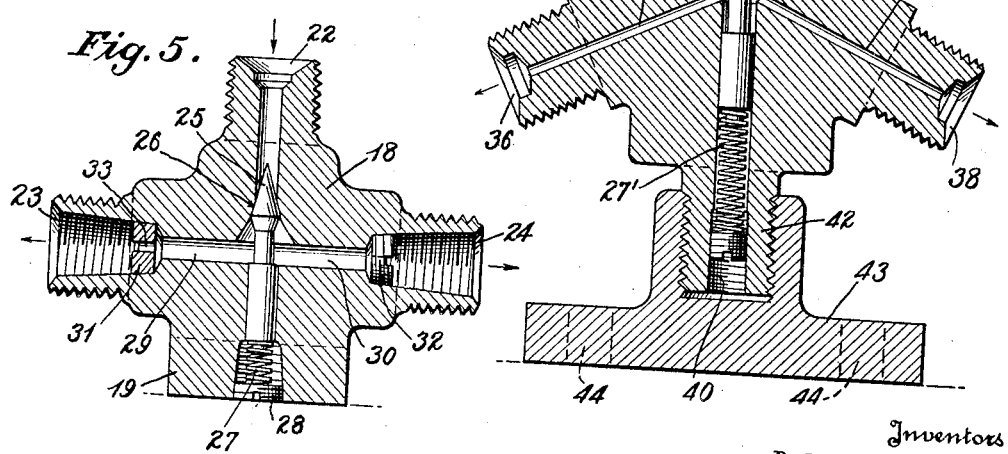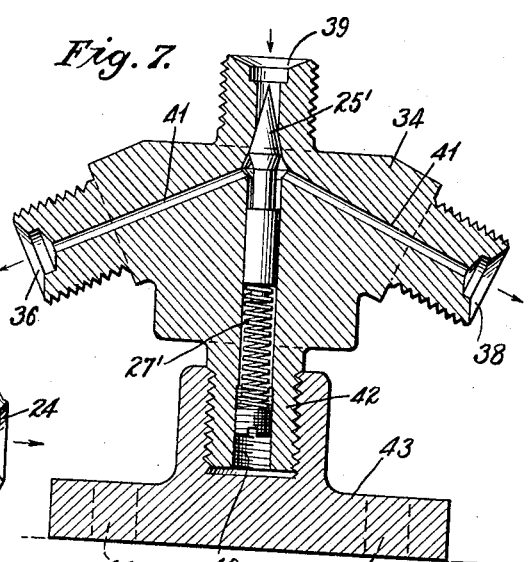

1,891,972

UNITED STATES PATENT OFFICE

DE LANCEY W. DAVIS, OF SAYRE, AND JOHN P. LAUX, OF BETHLEHEM, PENNSYLVANIA

LUBRICATING SYSTEM

Application filed December 18, 1931. Serial No. 581,961.

The invention relates to lubricating systems and has as an object the provision of a centralized automatically actuated system for railway locomotives, coaches, and the like.

It is a further object of the invention to provide a system of the character described which will supply lubricant to the wearing surfaces of a railway vehicle in accordance with the need therefor as determined by the speed of the vehicle.

It is a further object of the invention to provide a system of the character described having means whereby a limited number of fuel pumps may supply a large number of wearing surfaces with lubricant.

It is a further object of the invention to provide a lubricant distributing device for use in the system of the invention.

Further objects of the invention will appear from the following description when read in connection with the accompanying drawings showing illustrative embodiments of the invention and wherein:—

Fig. 1 is a plan view of a locomotive frame and wheels shown diagrammatically with the system of the invention applied thereto;

Fig. 2 is a diagrammatic layout of a lubricant pump casting indicating the parts supplied by the various pumps embodied therein as applied to a locomotive;

Fig. 3 is a sectional view of a form of brass showing the manner of application of the lubricant to various journal bearings;

Fig. 4 is a plan view of a lubricant distributing device;

Fig. 5 is a vertical section on line 5—5 of Fig. 4;

Fig. 6 is a plan view of a modified form of distributing device; and

Fig. 7 is a vertical section on line 7—7 of Fig. 6.

As shown the system is applied to a locomotive chassis comprising a frame 10, trailer 11, and pony truck 12, there being shown three sets of drive wheels 13, 14, 15, also two pairs of wheels for the pony truck and one trailer pair.

To provide lubricant to the bearings of each of the wheels mentioned as well as to the guides, the cylinders, valves, air pump and stoker, a fourteen-pump lubricator is indicated at 16 mounted above the guides in such position that the pistons in the several pumps of the lubricator may be driven by a cam member operated by the cross-head, not shown.

The structure of the lubricator forms no part of the present invention as any one of a number of commercial lubricators now on the market may be utilized, it being understood that in each of the cylinders 17, indicated in Fig. 2, a piston is reciprocated by a working part of the vehicle upon which the system is mounted when the vehicle is in motion, as a result of which lubricant will be supplied to the various wearing surfaces directly in proportion to the speed of the vehicle.

Wearing surfaces to be lubricated which require a large amount of lubricant, as the cylinders and valves, air pump and the stoker and the central pair of drive wheels, are shown as supplied by a single conduit from one of the pumps of the lubricator. To carry out this plan of lubrication through the entire chassis would in the installation shown require twenty pumps in the lubricator if but one conduit were connected to each pump. In accordance with the invention the fourteen-pump lubricator illustrated is shown as supplying the twenty wearing surfaces, and if it were not necessary to devote a single pump to any single wearing surface, the twenty surfaces of this installation could be supplied with a five-pump lubricator. To accomplish multiple supply from a single pump the device shown in Figs. 4–7 inclusive is provided.

In the form of Figs. 4 and 5 a valve body 18 is shown as formed integral with a base 19 having openings 20, 21 for reception of clip bolts, the distributor body formed with an inlet opening 22 and outlet openings 23, 24. The oil supplied to the distributor at opening 22 is controlled by a valve 25 coacting with a tapered seat 26 and forced to the seat by a compression spring 27 whose tension may be adjusted by an abutment screw plug 28. The lubricant passing valve 25 is evenly divided between the passages 29, 30 and flows to conduits connected with the outlets 23, 24.

For a purpose to be described, the passages 29, 30 are provided with choke plugs 31, 32 each having a small opening 33 therein. The conical surface of the valve 25 is important not only to guide the valve to the seat but also to ensure a substantially equal distribution of oil to the two passages 29, 30.

In practice the spring 27 is so adjusted as to preserve a back pressure upon the pump of upward of one hundred pounds per square inch.

Should the delivery of lubricant from each opening 23 or 24 be blocked by stoppage in the oil delivery line, the choke valve 31 or 32 would prevent an absolutely free delivery of the entire volume of the oil to the unobstructed conduit and would therefore permit a portion of the high pressure in the pump line to be applied to the stoppage to clear the obstruction.

In Figs. 6 and 7 a four-way distributor is shown. In this form of the invention the distributor body 34 shown as having four outlets 35, 36, 37, 38, has an inlet 39 and a spring chamber opening 40. In this form of the invention the passages 41 to the respective outlets are each formed of such a size as to provide the choke action of the plugs 31, 32 of Fig. 5. The valve 25' and the spring 27' function as in the first shown form of the invention. The spring opening projection 42 is shown as externally screw-threaded for reception of a base 43 provided with attachment bolt openings 44. It will be understood that three or more than four branches from the distributor of the invention may be constructed without departing from the spirit of the invention.

From the outlet distributor a delivery conduit as 45 is shown in Fig. 3 as leading to the brass of a bearing indicated at 46 delivering to a bore in the body of the brass, which bore in turn communicates with a lubricant groove in the bearing surface of the brass. Conduits connecting the lubricator 16 with the distributors 18 are indicated at 47.

While the invention has been shown as applied to a locomotive chassis, it will be understood that it may be applied to a railway coach or a freight car without departing from the spirit of the invention.

In the absence of a reciprocating part upon the vehicle, an eccentric cam and connecting rod may be readily attached to any suitable rotating part without difficulty.

Minor changes may be made in the physical embodiment of the invention within the scope of the appended claims without departing from the spirit thereof.

We claim:

1. An oil distributing device for lubricator systems comprising, in combination: a valve casing having an inlet passage inwardly terminating in a frusto conical valve seat, the surface of said seat extending therebeyond to provide a distributing chamber; a plurality of outlet passages leading from said chamber at uniformly spaced points thereabout; a conical valve body, spring-pressed toward said seat; the apex of said valve body when forced from said seat standing centrally of said inlet passage whereby to equally distribute oil to said outlet passages.

2. An oil distributing device for lubricator systems comprising, in combination: a valve casing having an inlet passage inwardly terminating in a frusto conical valve seat, the surface of said seat extending therebeyond to provide a distributing chamber; said casing having a plunger chamber in alignment with said inlet passage leading from said distributing chamber; a plurality of outlet passages leading from said distributing chamber at uniformly spaced points thereabout; a plunger slidable in said plunger chamber; a conical valve body carried by said plunger; a spring acting on said plunger to press the valve body toward said seat; the apex of the valve body when away from said seat standing centrally of said inlet passage to equally distribute oil to said outlet passages.

DE LANCEY W. DAVIS.
JOHN P. LAUX.